Aug. 12, 1969  AKIRA SHIBATA  3,460,735
HEADING MACHINE
Filed Sept. 13, 1965  3 Sheets-Sheet 3
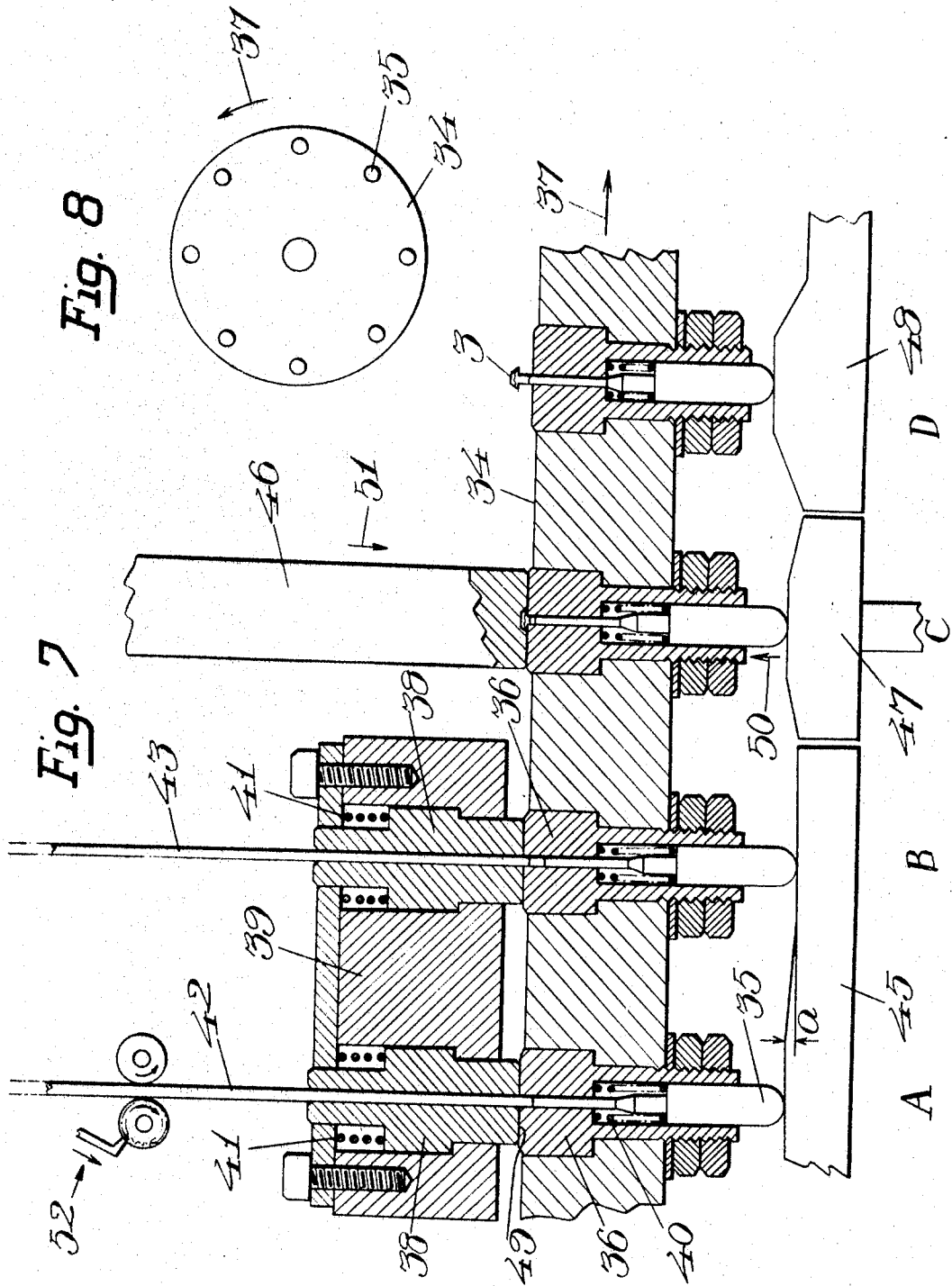
INVENTOR.
AKIRA SHIBATA
BY
ATTORNEYS United States Patent Office 3,460,735
Patented Aug. 12, 1969

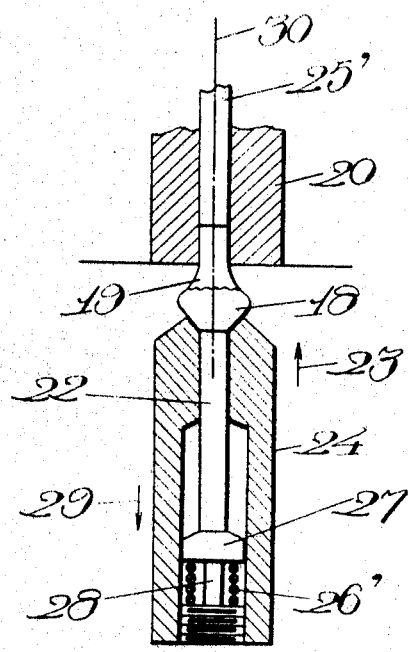
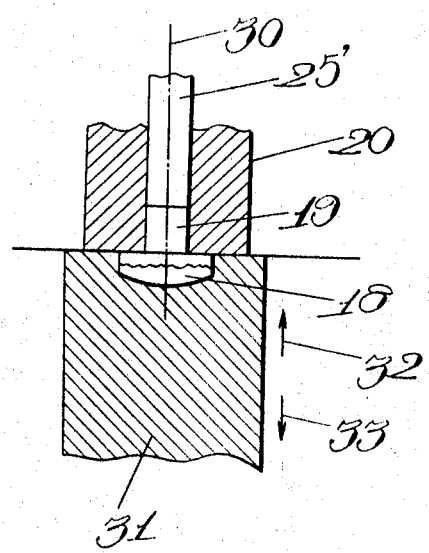
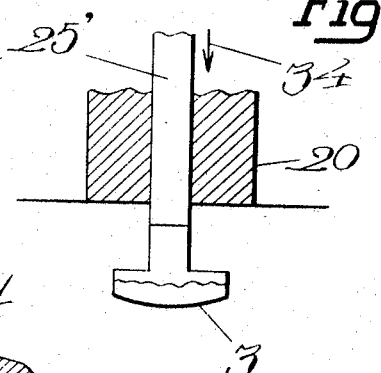
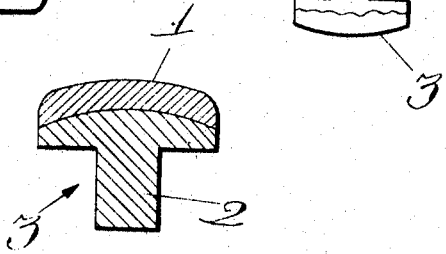

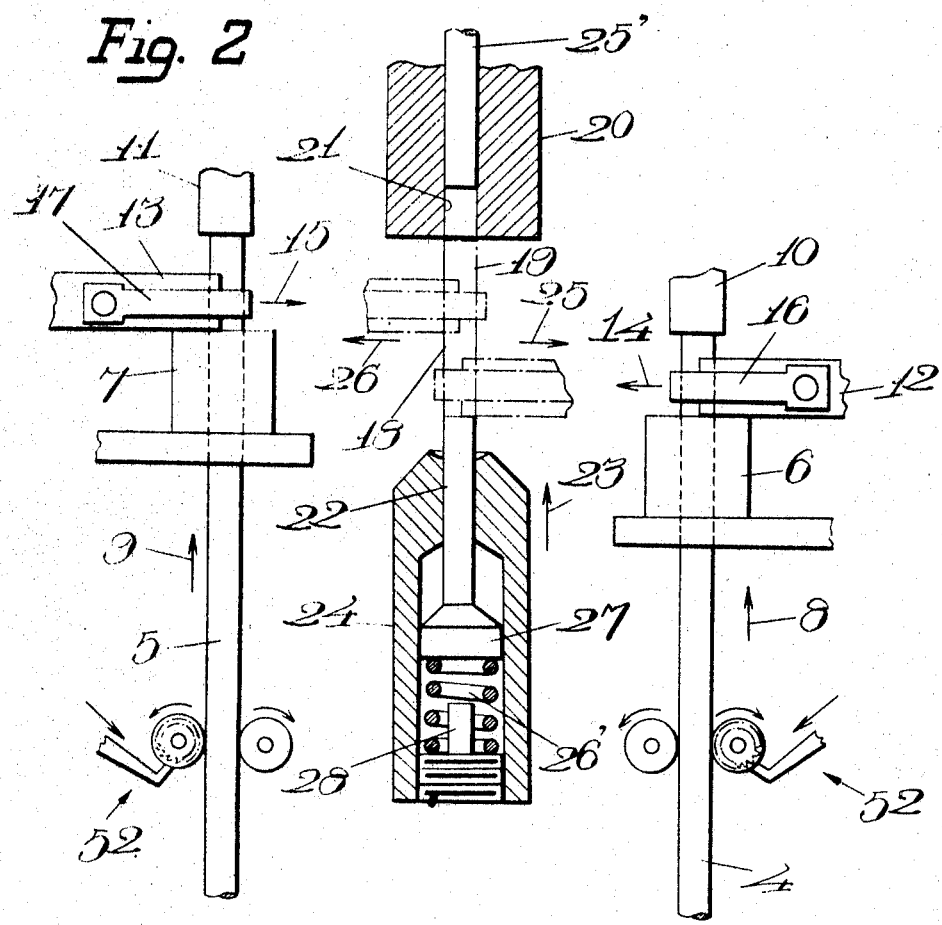
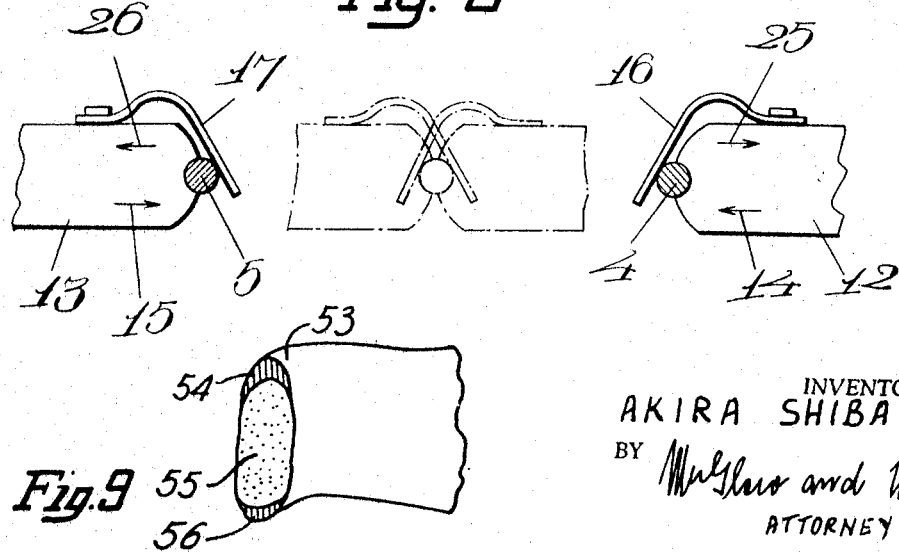

3,460,735
HEADING MACHINE
Akira Shibata, Tokyo, Japan, assignor to Chugai Denki Kogyo Kabushiki Kaisha, Tokyo, Japan
Filed Sept. 13, 1965, Ser. No. 486,621
Claims priority, application Japan, May 13, 1965, 40/28,128
Int. Cl. B23k 21/00; B21k 1/46
U.S. Cl. 228—18                        6 Claims

ABSTRACT OF THE DISCLOSURE

A heading machine for joining and shaping, by cold welding under pressure, cut lengths of wire of respectively different metal compositions includes means for feeding continuous wires of the different metal compositions, means for severing short lengths of the different wires, means for positioning and retaining the short lengths in axial alignment with each other, pressure means for forcing the cut ends of the short lengths of wire into abutment to cold weld the short lengths to each other, and shaping means operable to deform and "head" one end of the joined short wire pieces.

BACKGROUND OF THE INVENTION

This invention relates to a heading machine, more particularly to a machine for use in heading a metal piece in which a metal piece, such as a cut wire rod, is headed with a metal piece, such as a cut wire rod consisting of different kinds of metal, and simultaneously the headed metal piece thus obtained is pressed to a desired form.

Thus, the present invention consists in a heading machine of the kind in which a number of metal pieces consisting of different kinds of metal are joined together at the same time that they are pressed; and an object thereof is to provide a machine for manufacturing headed metal products, such as an electric contact made from cheap or base metal joined to costly precious metal, thereby to reduce the cost of such metal headed products, and also a heading machine for producing such products in large quantities automatically and successively.

Another object of the present invention is to provide a machine for joining and shaping a number of metal pieces consisting of different kinds of metal each having different physical properties to produce, efficiently and in large quantities, various kinds of metallic parts having a specific physical property which may prove to be effective in use and advantageous from the point of view of machine engineering.

In the drawings:

FIG. 1 is a longitudinal cross-section of a rivet-type electric contact showing an example of the products manufactured in accordance with the present machine;

FIG. 2 is an illustrative front view, partly cut away, of the means for supplying, shearing, guiding and forming under pressure the metal pieces to be processed according to the present machine;

FIG. 3 is a plan view illustrating especially the working of shearing and guiding means shown in FIG. 2;

FIGS. 4 to 6 are views illustrating the procedure and working effected in accordance with the present machine and illustrating, specifically and respectively, the joining means in its working state, shown in FIG. 2, a shaping means of the present machine in its working state, and the shaped product as it is extracted from the means;

FIG. 7 is a partly sectional view showing another embodiment of the machine according to the present invention;

FIG. 8 is a view illustrating the arrangement of the principal members of the machine shown in FIG. 7, and FIG. 9 is a perspective view of a cut wire.

The structure and working of the present invention will now be described with reference to the attached drawing showing certain preferred embodiments thereof.

By way of giving a concrete example, initial consideration will be given to a heading machine in the specific case where a base metal 2, such as a copper wire rod, is headed with a contact portion 1 consisting of precious metal, such as silver, and shaped as a whole to form a rivet-type electric contact 3 as shown in FIG. 1.

In FIGS. 2 and 3, lengths of silver wire rod 4 and copper wire rod 5 are supplied in the directions as shown by the arrows 8 and 9, respectively, through metal guide fixtures 6 and 7 by the feeding or supplying means 52. Reference numerals 10, 11 indicate stops for determining the cutting gauges of the silver wire 4 and copper wire 5, respectively.

The shearing and guiding means of the present machine comprises cutting shearing elements 12, 13 movable relatively to FIGURES 7 and 6, respectively, in the directions shown by the arrows 14 and 15 to shear the silver wire 4 and copper wire 5, respectively. The silver wire piece 18 and the copper wire piece 19 shorn by the shearing elements 12, 13 are chucked simultaneously by the crampon springs 16, 17 attached to the shearing elements 12, 13, respectively, and moved at high speed to a fixed position in which they are axially aligned with the bore 21, formed in the bolster 20, and with the axial line of operation of pin sleeve 24 and die 31 (FIG. 5). The pieces 18 and 19 are in axial end-to-end abutment with each other.

Cutting the silver piece 18 and the copper piece 19 at respective different positions has the advantage that the cut lengths of these pieces can be independently varied at will by adjusting the positions of the stop members 10 and 11. Furthermore, moving the silver wire piece 18 and the copper wire piece 19, thus cut and chucked, at high speed, to a fixed position in which they are aligned, and placing them in end-to-end abutment, has the advantageous feature that the cut surfaces can be maintained in a fresh state without being abraded by other guiding means and the like, and oxidation of the cut surfaces can be reduced to a minimum because of the high speed operation. Additionally, the high speed movement of the cut pieces into axially aligned end-to-end abutment greatly accelerates production.

At this juncture, the pressing pin 22 aligned with the bore 21 starts to move, together with pin sleeve 24, in the direction indicated by the arrow 23, pressing the silver wire piece 18 to abut copper wire piece 19 and force the latter into the bore 21 formed in the bolster 20. Simultaneously, the shearing members 12 and 13 start to return in the directions indicated by the arrows 25 and 26, respectively. The pressing pin 22 and the pin sleeve 24 are moved still further in the direction indicated by the arrow 23, and the copper wire piece 19 abuts the extruder pin 25'. As pin sleeve 24 is moved further with a big force in the direction indicated by the arrow 23, the spring 26' is compressed, as shown in FIG. 4, and the enlarged end 27 of pressing pin 22 abuts the metal bearing fixture 28. In this state, the pin sleeve 24 is moved further in the direction indicated by the arrow 23 with a big force, and the piece of silver wire 18 and piece of copper wire 19 are pressed together and cold welded at the same time that they are deformed to the shape shown in FIG. 4, in which the cold weld has a cross sectional area larger than that of the silver or copper wire.

The pin sleeve 24, with associated parts including the attached pressing pin 22, is returned in the direction shown by the arrow 29 and moved out of the axial line 30, when the die 31, moved from a nearby position, is positioned on the axial line 30 and moved forward in the direction shown by the arrow mark 32, exerting strong pressure on the joined silver wire piece 18 and copper wire piece 19 to shape the same under pressure to a desired shape.

The metal die 31 is retracted in the direction indicated by the arrow 33 at the same time that the shaping process is completed, and returned to a position off the axial line 30. The extruder pin 25' is then moved in the direction as shown by the arrow 34, ejecting the rivet-type electric contact 3 from the bolster 20. This process is carried on and repeated sequentially, and the rivet-type electric contacts 3, as shown in FIG. 1, may be produced speedily and in large quantities and with a significantly improved production rate.

To further increase the production rate, as the silver wire piece 18 and copper wire piece 19 are abutted in end-to-end relation, with the copper wire piece 19 extending into the bore 21, as metal die 31 is positioned in axial alignment with the axis 30, extruder pin 25' may be moved outwardly to assist in shaping the silver wire piece 18 and the copper wire piece 19 in the metal die 31.

While the description has been directed to the case of cold welding and shaping of metal pieces consisting of two different kinds of metal placed end to end and aligned axially, it is to be noted that cold welding and shaping of three or more metal pieces, each consisting of a different kind of metal, placed end to end and aligned axially may also be carried out in the like manner. Also, heat may be applied externally by means of an electric heater and the like at the time that the metal pieces are pressed together to promote the joining and shaping operations. It is also to be stated that the joining operation may desirably be carried out under neutral atmospheric conditions to prevent oxidation of the metal pieces to be subjected to the operation.

Referring to the further embodiment of the present invention shown in FIGS. 7 and 8, a number of pin sleeves 36, each having a pressing pin 35 slidably mounted therein, are fitted an equal circumferential spacing on the perimeter of a rotary disc 34 arranged to be turned stepwise, or intermittently, in the direction indicated by the arrow 37, and then stopped. Two or more wire piece supplying sleeves 38, having the same circumferential spacing as the pin sleeves 36, are arranged each to abut on the upper surfaces of two or more adjacent pin sleeves in axially aligned relationship therewith and held in position by the wire sleeve retainer piece 39 positioned above the rotary disc 34.

Pressing pins 36 are biased upwardly by springs 40, and the wire piece supplying sleeves 38 are biased downwardly by springs 41.

The wire piece supplying sleeves 38 are provided with central bores for receiving wires of different kinds of metal each adapted to be inserted at the outer ends into the central bores of the pin sleeves 36 abutting the wire piece supplying sleeves 38.

As the rotary disc 34 is rotated in the direction shown by the arrow 37, the lower ends of the pressing pins 35 slide on the surface of the cam 45 placed directly below the periphery of the disc and, in accordance with the variations in the level of the cam surface, pins 35 are moved in and out of the pin sleeves 36. Numeral 46 is a die, 47 a metal bearing fixture provided on the cam and 48 an extruder or ejector cam.

As the rotary disc 34 is rotated and the pin sleeve 36 moved speedily and with great force from the position A, the copper wire length 42 inserted into the wire piece supplying sleeve 38 and projecting partly into the pin sleeve 36 is cut on the abutting surface 49 of the wire supplying sleeve 38 and pin sleeve 36, and the copper wire piece 42 inserted in the bore of the pin sleeve 36 arrives at the position B as the rotary disc 39 is rotated by one step.

The pin 35 slides on the surface of the cam 45 and is depressed by the distance a. At this juncture, the silver wire 43 is inserted into the bore of the pin sleeve 36. As the rotary disc is rotated further by one step, the silver wire cut on the abutting surface of the wire supplying sleeve 38 and pin sleeve 36, and the piece of silver wire 43 inserted into the bore of the pin sleeve 36 arrives at the position C.

Cutting copper wire 42 and silver wire 43 on respective different axial lines, in the manner just mentioned, is advantageous in that the cut lengths of the two wires can be varied at will by suitable selection of the dimensions of cam 45. Moreover, moving the cut copper and silver wires inserted into the bore of pin sleeve 36 to a position in line with die 46, besides being conducive improvement in the production rate, has the advantages that the cut surfaces can be maintained in the fresh state without being abraded by other guiding means over a relatively long period of time, and that oxidation of the cut surfaces can be reduced to a minimum due to the high speed stepped rotation of rotary disk 34, which results in a reduction of the time required to shape the cut copper and silver wires.

Right at the position C, the pin 35 engages the metal bearing fixture 47 and is projected in the direction shown by the arrow 50, forcing the silver wire piece, and copper wire piece inserted into the central bore of the pin sleeve 36, outwardly of the central bore of the pin sleeve 36. At this juncture, the metal die 46 impinges several times successively on the copper and silver wire pieces placed end to end, in the direction shown by the arrow 51, so that the silver and copper wire pieces are shaped to a configuration such that the weld has a cross sectional area larger than that of the copper or silver wire. This shaping occurs at the same time that they are cold welded together. It is to be understood that the silver and copper wire pieces may be struck several successive times by the metal die 46 projected from the central bore of the sleeve 36. Thereafter, the rotary disc is rotated further one step in the direction shown by the arrow 37, just as formerly, and as the pin sleeve arrives at the position D, the pin 35 is positioned above the extruder cam 48 and is projected further outwardly in the direction indicated by the arrow 51, ejecting the headed metal product 3 as an unit.

While the present invention has been described with reference to two embodiments thereof, the term "cut surfaces" as mentioned hereinabove will be explained in detail. It is a well-known fact that wire, when cut, generally has the sectional shape shown in FIG. 9. In FIG. 9, 53 indicates a rounded edge, 54 a cut surface, 55 a cleavage or fractured surface and 56 a burr. It is the fractured surface 55 that is to be cold welded most securely by means of the invention apparatus. Immediately after cutting, temperature on this section of the wire is raised due to the heat generated by cleavage. Moreover, this section or surface 55 is clean and highly activated. If viewed microscopically, it is a very rugged surface which even further increases the superficial measure of the activated surface. These features of the cleavage surface provide the advantage of the present invention whereby the most securely welded joints can be obtained not withoutstanding the relatively small degree of deformation, as involved in the cold welding process of the invention.

Conversely, with this degree of deformation, it is not possible to weld surfaces other than the fractured surfaces such as, for instance, the relatively blossy cut surfaces 54, even if such surfaces are to be cold pressure welded together. Even if cleaned by suitable methods, such as electrolysis or scraping, these glossy cut surfaces cannot be pressure welded with the degree of deformation of the invention. Thus, the larger the superficial content of the fractured surface 55, the larger is the welding surface and consequently the stronger the weld. It is therefore desirable that this fractured surface 55 be increased in area.

In order to effect this, it is necessary to suitably select the spacing between the cutting edges to cut the wires, and also to increase the cutting speed. This is attained by the present invention and is one of the advantages of a production process according to the invention, providing for mass production in a very satisfactory manner. According to the present invention, rivet-shaped pressure welded electric contacts, having a strong weld and having a head 4 mm. across can be produced from metal wire having a 2 mm. diameter. This feature is another advantage of the present invention considering that pieces of wire cannot be pressure welded together with this degree of deformation by means of conventional processes wherein two pieces of wire are butt welded together.

Moreover, inasmuch as the method of the present invention enables pressure welding with a relatively small degree of deformation, pieces of wire produced by the process of powder metallurgy such as, for instance, silver-nickel, may be employed to form pressure welded contacts without formation of such defects as breakage or cracks. This is an additional advantage of the present invention.

It is obvious that the machine as described has advantageous features such as lowered production cost resulting from the use of base metal instead of more costly metal in the production of a metallic part which has been composed formerly as a whole from a single expensive metal, with the expensive metal used only in the important part of the metal part, and the automatic and continuous operation in the production process of such metallic part thus contributing to an increase in the production rate.

What is claimed is:

1. A heading machine for joining and shaping under pressure at least two metal pieces, such as cut lengths of wire, of respectively different metal compositions, abutted in axially aligned end-to-end relation, said heading machine comprising, in combination, at least two wire guide means; means feeding wires of respectively different metal compositions to said guide means; at least two shear means, each operatively associated with a respective guide means operable to cut pieces of wire projected from said guide means, with the respective lengths of the cut wire pieces being proportionate to the ratio of the amounts of the respective metal compositions in the finished product; chuck means formed with bore means and including pin means longitudinally displaceable in said bore means, said chuck means being displaceable parallel to the longitudinal extent of said bore means; retainer means operable to receive the cut wire pieces and position their cut ends in abutment with the cut wire pieces in axial alignment with said chuck means whereby, upon such bodily movement of said chuck means, at least one of the cut wire pieces is received in said bore means; pressing means, including said pin means, operable to exert pressure on the opposite ends of the aligned cut wire pieces to deform the cut wire pieces at their interfaces to cold weld the cut ends of the wire pieces to form a composite member; and shaping means operable to engage and press the end of said composite member projecting from said bore means and, in cooperation with said pin means engaging the other end of said composite member, to shape said projecting end of the latter to form the finished product.

2. A heading machine, as claimed in claim 1, in which said chuck means comprises a bolster having a bore constituting said bore means and a sleeve having a bore, said bolster and said sleeve being arranged with their bores axially aligned and in longitudinally spaced relation, and each of said bores having a pin displaceable therein; said sleeve and its pin being bodily displaceable to engage one end of the aligned cut wire pieces to move the cut wire pieces in a direction to engage the cut wire piece at the other end in the bore of said bolster and in engagement with the bolster pin; said sleeve and its pin being further displaceable toward said bolster, with the bolster pin remaining stationary, to exert pressure on the opposite ends of the aligned cut wire pieces to deform the cut wire pieces at their interfaces to cold weld the cut ends thereof to form the composite member.

3. A heading machine, as claimed in claim 1, in which shearing of the fed wire to form the cut wire pieces is effected by said retainer means in cooperation with said guide means.

4. A heading machine, as claimed in claim 2, in which shearing of the fed wire to form the cut wire pieces is effected by said retainer means in cooperation with said guide means; said guide means being spaced laterally from each other and said chuck means being located between said guide means; said retainer means comprising a pair of retainers movable, during shearing of the fed wire, toward said chuck means to retain and carry the two cut wire pieces into alignment with each other and into alignment with the bores in said chuck means; said two retainers being movable in spaced parallel paths toward the axis of said chuck means.

5. A heading machine, as claimed in claim 4, in which said shaping means is a heading die; said sleeve and its pin being displaceable out of alignment with said bolster and its bore, and said shaping means being movable into alignment with said bolster and said bore to cooperate with said bolster and the pin therein in forming a head on the projecting end of said composite member.

6. A heading machine, as claimed in claim 5, in which the pin in the bolster bore is displaceable along said bore to eject the finished product from the bolster bore after displacement of said heading die out of alignment with the bolster bore.

References Cited

UNITED STATES PATENTS

| 3,026,603 | 3/1962 | Zysk | 29—630 |
| 3,279,505 | 10/1966 | Renz | 29—630 |
| 3,311,965 | 4/1967 | Gwyn | 228—3 |

FOREIGN PATENTS

| 944,161 | 6/1956 | Germany. |
| 1,135,272 | 8/1962 | Germany. |
| 1,243,746 | 9/1960 | France. |

CHARLES W. LANHAM, Primary Examiner

G. P. CROSBY, Assistant Examiner

U.S. Cl. X.R.

10—27; 29—470, 630; 72—332, 335